Sept. 8, 1964 R. R. BROWN 3,148,011
ELECTRICAL CABLE CONNECTOR MEANS AND METHOD
OF TERMINATING SUCH CABLE
Original Filed Nov. 17, 1958 2 Sheets-Sheet 1

INVENTOR
ROBERT R. BROWN

*Richard A. Craig*

ATTORNEY

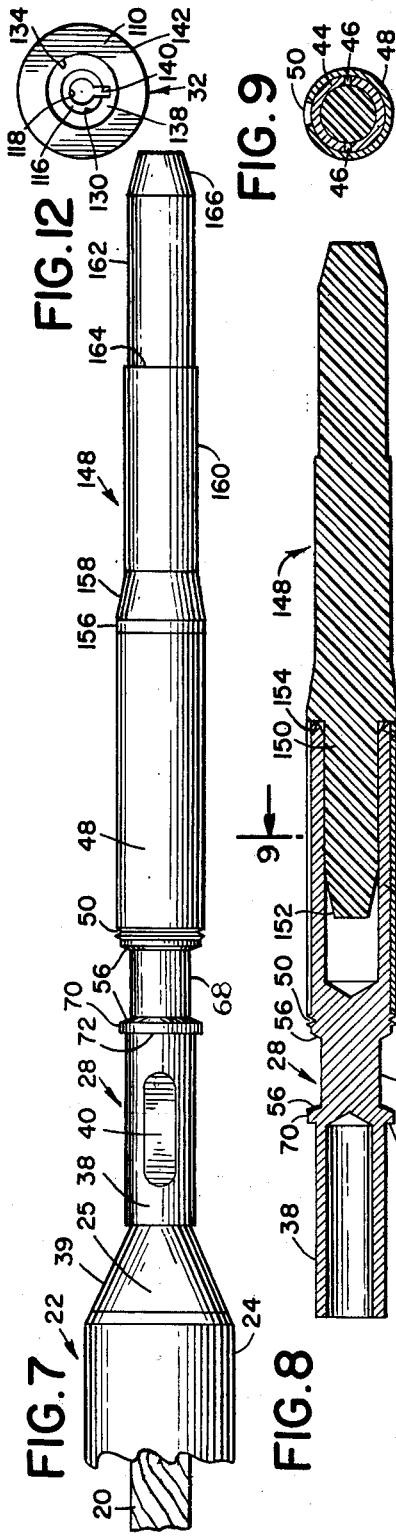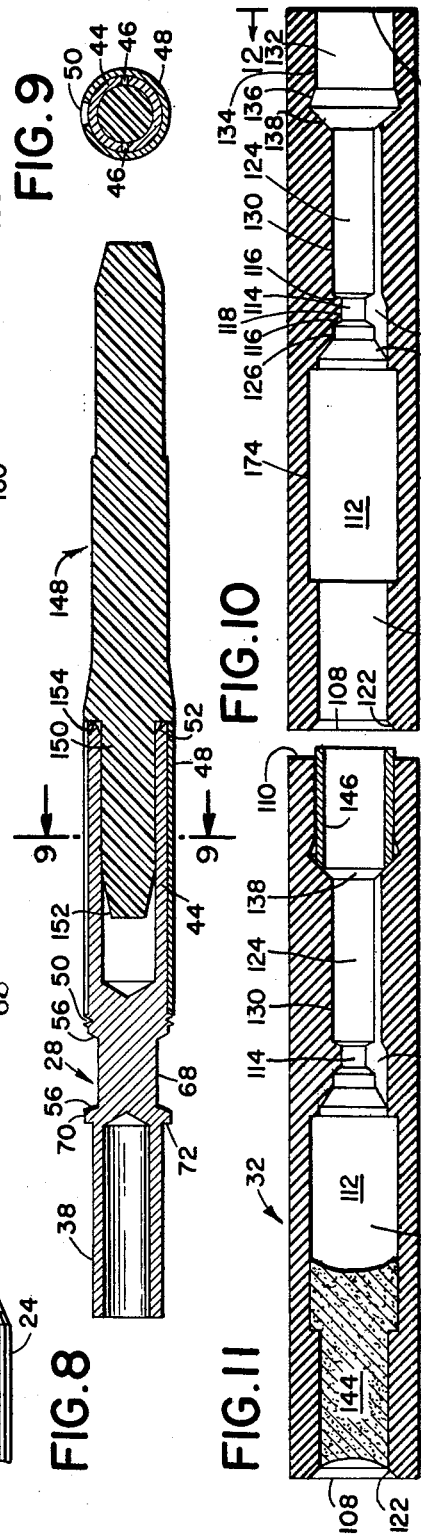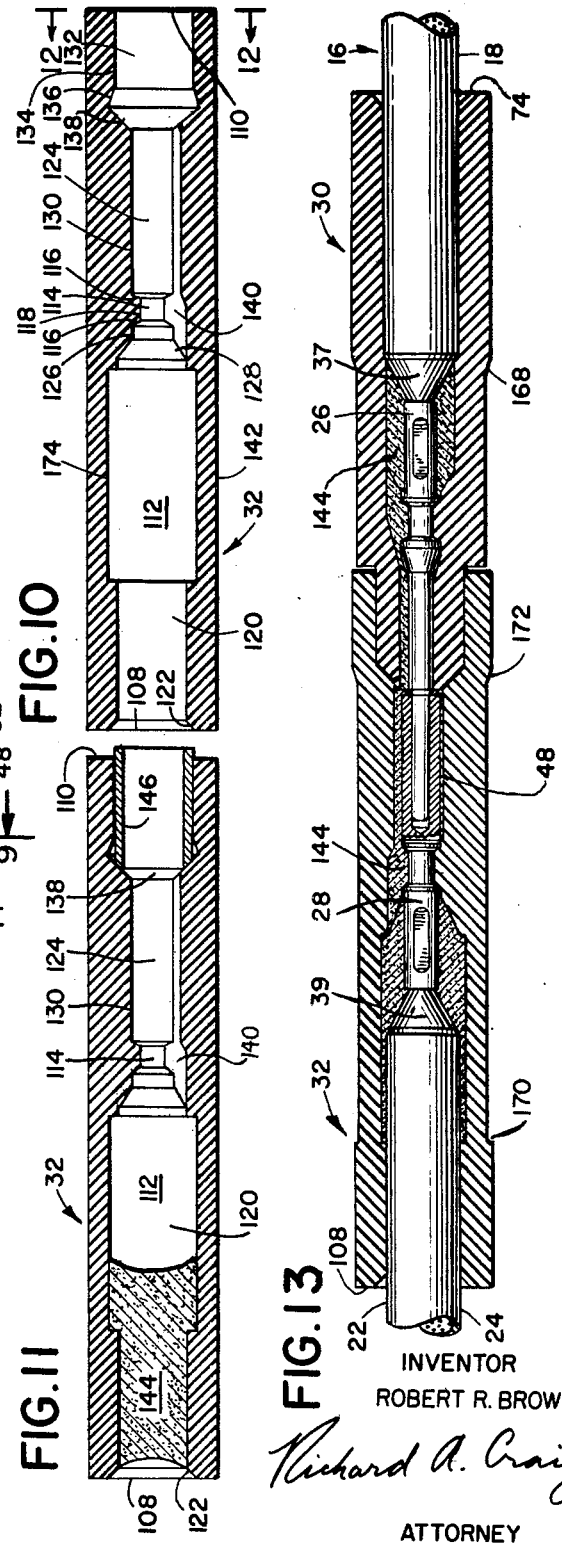

United States Patent Office 3,148,011
Patented Sept. 8, 1964

3,148,011
ELECTRICAL CABLE CONNECTOR MEANS AND METHOD OF TERMINATING SUCH CABLE
Robert R. Brown, Bernardsville, N.J., assignor to Elastic Stop Nut Corporation of America, Union, N.J., a corporation of New Jersey
Continuation of application Ser. No. 774,456, Nov. 17, 1958. This application Aug. 2, 1962, Ser. No. 215,483
7 Claims. (Cl. 339—218)

This is a continuation of copending application Serial No. 774,456, filed November 17, 1958, now abandoned.

This invention relates to electrical cable connector means and to a method of terminating such cable.

It is desirable in the use of electrical cables and particularly in the installation of a system in which the cables and other components (such as transformers, reactors, motors, potheads, etc.) are directly buried in the ground, placed on or above the ground and hence exposed to sunlight, or immersed in fresh or even salt water, to be able releasably to join, electrically and mechanically, cable ends to each other as well as to other components at locations determined primarily by conditions encountered in the field during installation and which are more or less unpredictable in advance of actual installation.

It is known to provide the ends of predetermined cable lengths, and other components at the factory with integral connectors which can readily be plugged together by hand in the field to provide a releasable waterproof connection between two such cable lengths or between one such cable length and another component. Such connectors, as applied to cable lengths, are, however, subject to the disadvantage that the cable lengths are predetermined thus entailing a handicap in the field. Also, where such connectors are used the cable must be handled twice, resulting in added expense.

Various proposals have been made for overcoming the above problem, but most have been subject to serious disadvantages, either as to original cost, complexity of use and/or unsatisfactory performance. One involves the use of molding equipment in the field and another produces a connection which is not releasable.

This invention provides a releasable waterproof and gasproof electrical connection and means for making such a connection in a way which completely solves the above problem.

Accordingly important objects of the invention are to provide a releasable waterproof electrical connection which can readily be made at any desired location during installation of a system of the type referred to.

In one aspect the invention contemplates an electrical fitting in the form of a socket member, an electrical fitting in the form of a plug member and a housing for each fitting. In use the ends of two cable lengths to be joined are skived to expose the conducting means thereof, the fittings are affixed to the conducting means and are then inserted into the respective housings. The connection is completed by thereupon sliding the plug member into frictional engagement with the socket member; simultaneously the housings frictionally engage each other to provide a waterseal.

A predetermined amount of insulating mastic material is preferably preinserted into each housing to fill voids, retard corona, exclude moisture and gases and ease assembly.

Therefore additional important objects of the invention are to provide an electrical connection and means for making such connection in which internal voids are filled with insulating material, corona resistance is exceptional, resistance to the entry of moisture and gases is exceptional and assembly is readily accomplished.

The above and further objects and advantages will appear from the following description of a preferred example of the invention and the accompanying drawings thereof wherein:

FIG. 7 is a longitudinal elevation of the other fitting affixed to the conducting means of another cable;

FIG. 8 is an axial sectional view of the fitting of FIG. 7;

FIG. 9 is a view on line 9—9 of FIG. 8;

FIG. 10 is an axial sectional view of the housing for the fitting of FIG. 7;

FIG. 11 is a view similar to FIG. 12 but showing mastic material in the housing;

FIG. 12 is a view on line 12—12 of FIG. 10; and

FIG. 13 is a view showing the fittings in longitudinal elevation and the housings in axial section, with the fittings engaging each other and the housings engaging each other, completing an electrical connection between the two cables.

Figure 1:
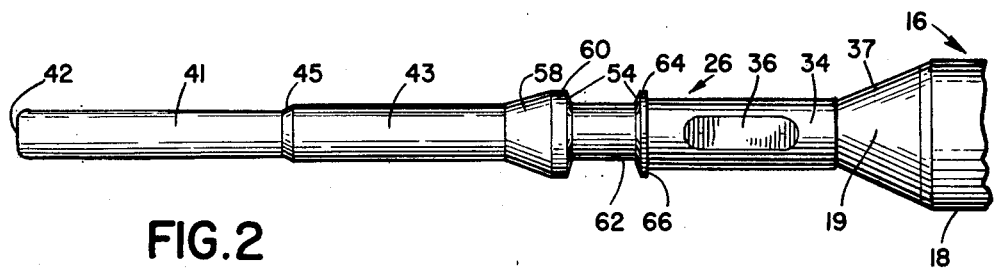
FIG. 1 is a longitudinal elevation of one of the fittings affixed to the conducting means of a cable.
Figure 2:
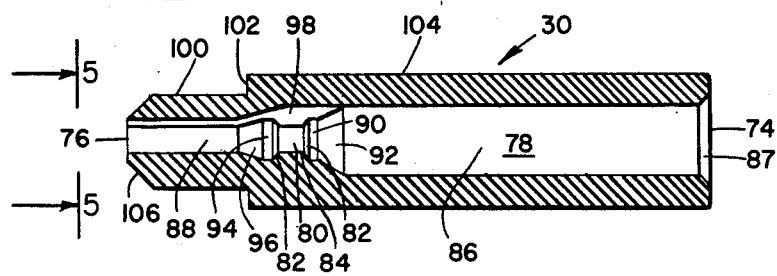
FIG. 2 is an axial sectional view of the housing for the fitting of FIG. 1.

The drawings show means for releasably making a waterproof electrical connection between conducting means 14 (FIG. 4) of a first cable 16 (FIGS. 1, 4 and 13) having an outer jacket 18 and inner insulation 19 and conducting means 20 (FIG. 7) of a second cable 22 (FIGS. 7 and 13) having an outer jacket 24 and inner insulation 25. Conducting means 14 and 20 are as shown wires.

The means for making the connection include an electrical fitting in the form of an elongate metallic plug member 26 (FIGS. 1, 4 and 13) defining an axis, an electrical fitting in the form of an elongate metallic receptacle or socket member 28 (FIGC. 7, 8 and 13) defining an axis, a tubular housing 30 (FIGS. 2 through 6 and 13) defining an axis and of resilient insulating material for plug member 26 and a tubular housing 32 (FIGS. 10 through 13) defining an axis and of resilient insulating material for socket member 28.

Plug member 26 has at one end a socket portion 34 adapted for permanent attachment to wires 14 of cable 16. Socket portion 34 has a malleable tubular wall into which the bared ends of wires 14 of cable 16 are inserted after which the tubular wall may be crimped in known manner to effect a permanent mechanical and electrical connection between plug member 26 and wires 14. A crimped area is shown at 36.

Likewise, socket member 28 has at one end a socket portion 38 adapted for permanent attachment to wires 20 of cable 22. Socket portion 38 has a malleable tubular wall into which the bared end of wires 20 are inserted after which the tubular wall may be crimped in known manner to effect a permanent mechanical and electrical connection between socket member 28 and wires 20. A crimped area is shown at 40.

Following the attachment of plug member 26 to cable 16 and of socket member 28 to cable 22 as aforesaid, the insulation and jackets of cables 16 and 22 are preferably beveled adjacent members 26 and 28 as shown at 37 and 39, respectively.

The end of plug member 26 remote from socket portion 34 has a solid plug portion 42 including a first cylindrical part 41 remote from socket portion 34 and a coaxial second cylindrical part 43 between part 41 and socket portion 34 and of greater diameter than part 41. Parts 41 and 43 are joined by a frusto-conical surface 45.

The end of socket member 28 remote from socket portion 38 has a cylindrical socket or receptacle portion 44 which, by virtue of a pair of diametrically opposite longitudinal slits 46 (FIG. 9), is somewhat resilient radially. To control the resiliency just referred to it may be desirable to provide socket member 28 with a longitudinally split sleeve 48 (which may be deemed a part of member 28) of resilient material such as beryllium copper embracing and frictionally engaging socket portion 44. Preferably sleeve 48 is oriented so that slits 46 are completely covered. One end of sleeve 48 coincides substantially with the open end of socket portion 44. For a reason which will be brought out it is desirable to provide means for maintaining sleeve 48 in the described and illustrated position with respect to socket member 28. Accordingly socket member 28 is provided with an annular external stop 50 extending therearound between socket portions 38 and 44. Stop 50 can conveniently be formed by rolling an external shoulder around socket member 28. As shown the other end of sleeve 48 engages stop 50. The normal inside diameter of socket portion 44, with sleeve 48 installed thereon, is slightly less than the diameter of plug part 41, so that socket portion 44 is adapted to receive plug part 41 in snug engagement therewith, electrically to connect wires 14 and 20.

Part 41 of plug member 26 is insertable into and removable from socket portion 44 by hand. This insertion is facilitated by an internal bevel 52 at the open end of socket portion 44 and is accompanied by an elastic radial expansion of socket portion 44 and sleeve 48.

Between socket portion 34 and plug portion 42 plug member 26 has a pair of longitudinally spaced confronting shoulders 54 extending around plug member 26. Shoulders 54 are frusto-conical so as to be furthest from each other at the radially outer parts thereof. Shoulders 54 are in effect mirror images of each other.

Between socket portion 38 and stop 50 socket member 28 has a pair of longitudinally spaced confronting shoulders 56 extending around socket member 28. Shoulders 56 are frusto-conical so as to be furthest from each other at the radially outer parts thereof. Shoulders 56 are in effect mirror images of each other.

Between that shoulder 54 remote from socket portion 34 and plug part 43 of plug member 26 there is a frusto-conical surface 58 which tapers from plug part 43 to the outer diameter of shoulder 54. That shoulder 54 referred to in this paragraph and frusto-conical surface 58 are joined by a cylindrical surface 60 of somewhat greater diameter than plug part 43.

Shoulders 54 are joined by a cylindrical surface 62 which as shown is of the same diameter as plug part 43.

Joining that shoulder 54 adjacent socket portion 34 is a cylindrical surface 64 of the same diameter as and coaxial with surface 60 and extending toward socket portion 34 from that shoulder 54. Joining surface 64 and the exterior of socket portion 34, the diameter of which is intermediate the diameters of surfaces 62 and 64, is a plane annular surface 66 perpendicular to the axis of plug member 26.

The normal outside diameter of socket portion 44 may be approximately the same as the diameter of surface 60, and shoulders 56 are joined by a cylindrical surface 68 of the same diameter and axial length as surface 62.

Joining that shoulder 56 adjacent socket portion 38 is a cylindrical surface 70 of the same diameter as and coaxial with the outer surface of socket portion 44 and extending toward socket portion 38 from that shoulder 56. Joining surface 70 and the exterior of socket portion 38, the diameter of which is intermediate the diameters of surfaces 68 and 70, is a plane annular surface 72 perpendicular to the axis of socket member 28.

The purpose of shoulders 54 and 56 and surfaces 62 and 68 and related parts of plug and socket members 26 and 28 will appear. Suffice it to say for the present that plug member 26 thus has an intermediate portion having circumferential flanges and a circumferential groove therebetween, provided by shoulders 54 and surface 62, and socket member 28 has an intermediate portion having circumferential flanges and a circumferential groove therebetween, provided by shoulders 54 and surface 62, and socket member 28 has an intermediate portion having circumferential flanges and a circumferential groove therebetween, provided by shoulders 56 and surface 68.

Housing 30 has plane ends 74 and 76 and an opening 78 therethrough from end 74 to end 76. Plug member 26 is adapted to be inserted by hand, plug portion 42 first, into opening 78 from end 74, as will appear in more detail.

Opening 78 has a portion indicated generally at 80 between ends 74 and 76 and adapted for interengagement with the intermediate portion of plug member 26 to limit the aforesaid insertion thereof into and to hold plug member 26 in predetermined position with respect to housing 30. More specifically, as shown, housing 30 has at portion 80 a pair of axially spaced frusto-conical shoulders 82, which in effect are mirror images of each other, and which are joined at the radially inner peripheries thereof by a cylindrical surface 84. The normal axial length of surface 84 is slightly less than the axial length of surface 62 of plug member 26 and the normal diameter of surface 84 is slightly greater than the diameter of surface 62. The diameter of plug part 43 is preferably substantially equal to the normal diameter of surface 84. Shoulders 54 and 82 are inclined with respect to the axes thereof at the same angle, which in the illustrated example is about 75 degrees.

Opening 78 also has a generally cylindrical portion indicated generally at 86 between portion 80 and end 74 and in open communication with the latter and adapted to receive therein socket portion 34 of plug member 26 and to receive therein and snugly engage a portion of jacket 18 of cable 16. The end of portion 86 at end 74 is chamfered as indicated at 87.

Opening 78 further has a cylindrical portion indicated generally at 88 between portion 80 and end 76 and in open communication with the latter and adapted to receive and snugly engage plug part 43 of plug member 26.

Between portions 80 and 86 and joining that shoulder 82 adjacent portion 86 is a cylindrical surface 90 of the same diameter as but slightly larger in axial length than surface 64. Joining the axial end of surface 90 adjacent portion 86 and portion 86 is a frusto-conical surface 92.

Between portions 80 and 88 and joining that shoulder 82 adjacent portion 88 is a cylindrical surface 94 of the same diameter as but slightly larger in axial length than surface 60. Joining the axial end of surface 94 adjacent portion 88 is a frusto-conical surface 96 which conforms in shape and size to surface 58 of plug member 26.

Extending from portion 86 through portion 80 and portion 88 to end 76 is a longitudinal keyway or vent passage 98 at one side of opening 78 and in open communication with portion 86 and end 76 and in effect forming a part of opening 78.

Housing 30 further has an external cylindrical surface 100 located substantially radially outwardly from portion 88 of opening 78. The end of surface 100 remote from end 76 is defined by a plane annular surface 102 perpendicular to the axis of housing 30. As shown the plane of surface 102 intersects surface 96.

Joining the radially outer periphery of surface 102 and end 74 is a cylindrical surface 104.

Joining the end of surface 100 remote from surface 102 and end 76 is a frusto-conical surface 106 which in the illustrated example makes an angle of about 45 degrees with the axis of housing 30.

Housing 32 has plane ends 108 and 110 and an opening 112 therethrough from end 108 to end 110. Socket member 28, with sleeve 48 assembled therewith as aforesaid, is adapted to be inserted by hand, socket portion 44 first, into opening 112 from end 108, as will appear in more detail.

Opening 112 has a portion indicated generally at 114 between ends 108 and 110 and adapted for interengagement with the intermediate portion of socket member 28 to limit the aforesaid insertion thereof into and to hold socket member 28 in predetermined position with respect to housing 32. More specifically, as shown, housing 32 has at portion 114 a pair of axially spaced frusto-conical shoulders 116, which in effect are mirror images of each other, and which are joined at the radially inner peripheries thereof by a cylindrical surface 118. The normal axial length of surface 118 is slightly less than the axial length of surface 68 of socket member 28 and the normal diameter of surface 118 is slightly greater than the diameter of surface 68. Shoulders 56 and 116 are inclined with respect to the respective axes thereof at the same angle, which in the illustrated example is about 75 degrees.

Opening 112 also has a generally cylindrical portion indicated generally at 120 between portion 114 and end 108 and in open communication with the latter and adapted to receive therein socket portion 38 of socket member 28 and to receive therein and snugly engage a portion of jacket 24 of cable 16. The end of portion 120 at end 108 is chamfered as indicated at 122.

Opening 112 further has a cylindrical portion indicated generally at 124 between portion 114 and end 110 and in open communication with, but terminating short of end 110.

Between portions 114 and 120 and joining that shoulder 116 adjacent portion 120 is a cylindrical surface 126 of the same diameter as but slightly larger in axial extent than surface 70. Joining the axial end of surface 126 and portion 120 is a frusto-conical surface 128.

Portion 124 of opening 112 has a cylindrical surface 130 extending from one end thereof to the other and joining that shoulder 116 adjacent end 110 at the outer periphery thereof. The axial length of surface 130 is slightly greater than the axial length of socket member 28 from the outer periphery of that shoulder 56 adjacent socket portion 44 to the open end of socket portion 44. Surface 130 is adapted to receive socket portion 44 and sleeve 48 and snugly engage the latter.

Opening 112 has a further portion indicated generally at 132 between portion 124 and end 110 and in open communication with the latter. Portion 132 includes a cylindrical surface 134 joining end 110 and extending therefrom toward portion 124 and normally of slightly less diameter than surface 100 and adapted to receive surface 100 therein in a snug fit to produce therewith a waterseal between housings 30 and 32. In the illustrated example the diameter of surface 134 is greater than that of surface 130.

Portion 132 also includes a frusto-conical surface 136 intersecting the end of surface 134 remote from end 110 and of smallest diameter at its circle of juncture with surface 134. Portion 132 further includes a frusto-conical surface 138 joining cylindrical surface 130 and frusto-conical surface 136. In the illustrated example surfaces 136 and 138 are inclined with respect to the axis of housing 32 at angles of about 20 degrees and 45 degrees, respectively.

Extending from portion 120 through portion 114 and portion 124 to frusto-conical surface 138 is a longitudinal keyway or vent passage 140 at one side of opening 112 and in open communication with portion 120 and surface 138 and in effect forming a part of opening 112. Passage 140 is also in open communication with end 110.

Housing 32 in addition includes an external cylindrical surface 142 extending from end 108 to end 110 which surface in the illustrated example is of the same diameter as surface 104 of housing 30.

Housings 30 and 32 can be plugged together, with ends 76 and 110 confronting each other and with surface 100 received in and frictionally engaging surface 134 to provide the waterseal referred to between housings 30 and 32, until frusto-conical surface 106 engages frusto-conical surface 138. The parts are dimensioned so that this last engagement can take place, that is, the axial length of surface 100 is sufficient that the engagement in question is not prevented by an engagement of surface 102 and end 110.

Frusto-conical surfaces 136 and 138 provide a circumferential relief the purpose of which will appear.

Figure 3:
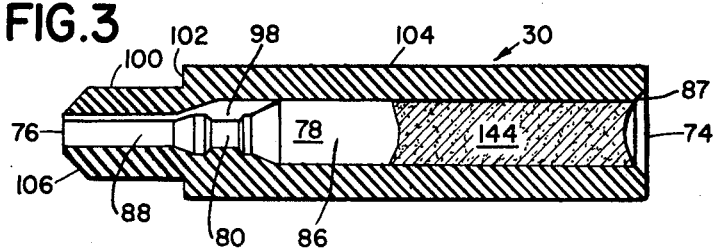
FIG. 3 is a view similar to FIG. 2 but showing mastic material in the housing.

As shown by FIGS. 3 and 11 predetermined amounts of mastic or filler material 144 are placed in portion 86 of opening 78 of housing 30 and in portion 120 of opening 112 of housing 32. In the case of housing 30 the mastic material 144 is shown as a mass extending substantially from chamfer 87 to the axial midportion of portion 86, and in the case of housing 32 the mastic material 144 is shown as a mass extending substantially from chamfer 122 to the axial midportion of portion 120.

For best results attention must be given to the material selected for mastic material 144. It should have high dielectric strength, low power factor, no moisture absorptivity, stability with respect to both chemical and physical properties, especially viscosity, at temperatures at least between about minus 40 and about plus 140 degrees Fahrenheit, high corona resistance and no toxicity. It should be ageless both physically and chemically, compatible with, non-corrosive and have a tendency to "wet" or adhere to the surfaces of the materials with which it comes in contact, the latter being desirable in order to prevent moisture creepage. It has been found that a preparation sold commercially as Silicone compound is admirably suited for use as mastic 144 and in the discussion which follows it will be assumed without limitation that this is the material employed.

For a purpose which will appear housing 32 is initially provided with a disposable sleeve 146 (FIG. 11) of any suitable rigid or semi-rigid material. Sleeve 146 is beveled at one end which engages surface 138 and has an outer surface snugly engaging surface 134 and a length sufficient so that the other end of sleeve 146 projects a predetermined distance beyond end 110 of housing 32. As shown the inside diameter of sleeve 146 is greater than the diameter of surface 130.

Also for a purpose which will appear a solid disposable pin 148 (FIGS. 7 and 8) of any suitable rigid material is initially assembled with socket member 28. Pin 148, which defines an axis, has a cylindrical surface 150 within and frictionally engaging socket portion 44. Axially adjacent portion 150 and also within socket portion 44 pin 148 has a frusto-conical surface 152 providing a bevel at one end of pin 148. Pin 148 further has a plane annular flange surface 154 perpendicular to the axis of pin 148 and terminating the end of surface 150 remote from frusto-conical surface 152. Surface 154 engages and covers the open end of socket portion 44 and the corresponding end of sleeve 48, the outside diameter of surface 154 being substantially equal to the outside diameter of sleeve 48. Axially adjacent surface 154 and intersecting surface 154 at the outer periphery thereof pin 148 has a cylindrical surface 156. Axially adjacent and intersecting surface 156 pin 148 has a frusto-conical surface 158 of largest diameter at its circle of juncture with surface 156. Axially adjacent and intersecting surface 158 pin 148 has a cylindrical surface 160. Axially adjacent surface 160 pin 148 has a cylindrical surface 162 of smaller diameter than surface 160 but of at least as great diameter as surface 118. Pin 148 also has a plane annular surface 164 joining surfaces 160 and 162. Axially adjacent surface 162 pin 148 has a frusto-conical surface 166 which at its circle of largest diameter intersects surface 162. Surface 166 provides a bevel at the end of pin 148 remote from frusto-conical surface 152.

The desired electrical connection between wires 14 and 20, utilizing the assemblies shown in FIGS. 1 and 7 and housings 30 and 32 as shown in FIGS. 3 and 11 with mastic material 144 therein, is effected briefly by pushing plug member 26 and the end of cable 16 adjacent thereto into housing 30, pushing pin 148, socket member 28, sleeve 48 and the end of cable 22 adjacent thereto into housing 32, disposing of sleeve 146 and pin 148, thereupon plugging part 41 of plug portion 42 of plug member 26 into socket portion 44 of socket member 28 and simultaneously pushing surface 100 of housing 30 into surface 134 of housing 32.

The operations referred to in the immediately preceding paragraph will now be described in greater detail.

Figure 4:
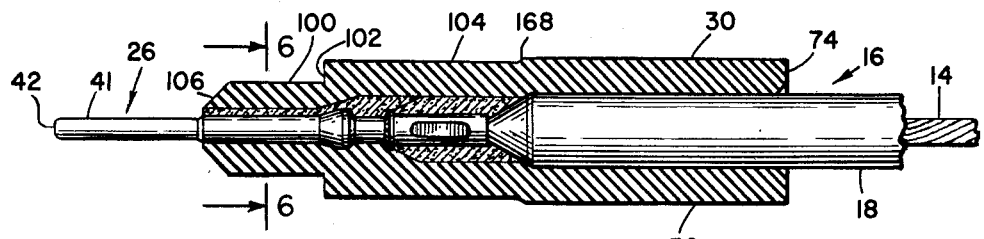
FIG. 4 is a view showing the fitting of FIG. 1 in longitudinal elevation and the housing of FIG. 3 after the former has been fully inserted into the latter.
Figure 5:
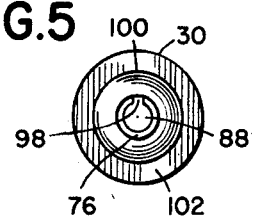
FIG. 5 is a view on line 5—5 of FIG. 2.
Figure 6:
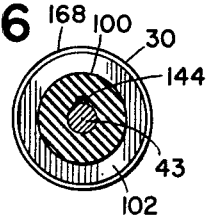
FIG. 6 is a view on line 6—6 of FIG. 4.

The installer grasps jacket 18 of cable 16 in one hand and surface 104 of housing 30 in the other hand, with part 41 of plug member 26 confronting and aligned with end 74 of housing 30 and by pushing inserts plug member 26 and related parts a predetermined distance into opening 78, namely, until shoulders 82 of housing 30 are between and interengage shoulders 54 of member 26, thus to limit such insertion and thereafter to hold housing 30 in predetermined position with respect to member 26 (FIGS. 4 and 13). With the parts thus positioned, part 41 projects outside housing 30 beyond end 76 thereof, part 43 is within and snugly engages portion 88 of opening 78, surface 58 is within surface 96, surface 60 is within surface 94, surface 62 is within surface 84 and surface 64 is within surface 90. Socket portion 34 is within portion 86 and spaced from the wall thereof as is beveled surface 37 of cable 16. A portion of jacket 18 of cable 16 is in snug frictional engagement with the wall of portion 86. The outside diameter of cable 16 is greater than the normal diameter of portion 86, and during the insertion referred to the diameter of portion 86 is substantially increased, resulting in an external bulging of housing 30 as shown at 168.

During the insertion in question portion 80 of opening 78 is temporarily expanded, this expansion being facilitated by engagement of frusto-conical surfaces 58 and 92. Entry of cable 16 into housing 30 is facilitated by bevels 37 and 87.

Relevant parts are dimensioned so that with shoulders 54 and 82 engaging each other as aforesaid frusto-conical surface 45 coincides with end 76 of housing 30, thus to provide visual indication that housing 30 and plug member 26 have been properly assembled, although it is likely that the installer will be able to feel the snapping of shoulders 82 into engagement with shoulders 54.

The installer grasps jacket 24 of cable 22 in one hand and surface 142 of housing 32 in the other hand, with pin 148 confronting and aligned with end 108 of housing 32 and by pushing inserts pin 148, socket member 28 and related parts a predetermined distance into opening 112, namely, until shoulders 116 of housing 32 are between and interengage shoulders 56 of socket member 32, thus to limit such insertion and thereafter to hold housing 32 in predetermined position with respect to member 28 (FIG. 13). With the parts in this predetermined position, pin 148 projects outside housing 32 beyond end 110 thereof, socket portion 44 and sleeve 48 are within surface 130, with the latter in snug engagement with sleeve 48. Surface 68 is within surface 118 and surface 70 is within surface 126. Socket portion 38 is within portion 120 and is spaced from the wall thereof as is beveled surface 39 of cable 22. A portion of jacket 24 of cable 22 is in snug frictional engagement with the wall of portion 120. The outside diameter of cable 22 is greater than the normal diameter of that part of portion 120 adjacent end 108, and during the installation referred to the diameter of portion 120 is substantially increased, resulting in an external bulging of housing 32 as shown at 170.

During the insertion in question portion 114 of opening 112 is temporarily expanded, this expansion being facilitated by engagement of frusto-conical surfaces 128 and 166. Entry of cable 22 into housing 32 is facilitated by bevels 39 and 122.

Relevant parts are dimensioned so that with shoulders 56 and 116 engaging each other as aforesaid annular surface 164 coincides with the exposed end of sleeve 146, thus to provide visual indication that housing 32 and socket member 28 have been properly assembled, although it is likely that the installer will be able to feel the snapping of shoulders 116 into engagement with shoulders 56.

Pin 148 and sleeve 146 are then removed, as by a pair of pliers, and thrown away.

During the insertion of socket member 28, sleeve 48 and related parts into housing 32 the latter exerts a frictional drag on sleeve 48 tending to move sleeve 48 with respect to socket member 28 toward socket portion 38. Stop 50 retains sleeve 48 in the illustrated position against the frictional drag.

The electrical connection between wires 14 and 20 is then completed by plugging part 41 of plug member 26 into the open end of socket portion 44 of socket member 28. Entry of part 41 into portion 44 is facilitated by bevel 52, and during this operation portion 44 and sleeve 48 are somewhat expanded radially, thus frictionally to grip part 41. The wall of housing 32 enhances this grip. Simultaneously housing 30 and 32 interengage each other, and more specifically, frusto-conical surface 106 and cylindrical surface 100 of housing 30 enter surface 134 of housing 32 until frusto-conical surface 106 engages frusto-conical surface 138 of housing 32. As stated and shown, this engagement limits the interengagement of housings 30 and 32. Frusto-conical surface 106 facilitates entry of end 76 of housing 30 into end 110 of housing 32. Since the diameter of surface 100 is greater than the normal diameter of surface 134, surface 134, the radially adjacent portion of the wall of housing 32 and surface 142 expand radially outwardly to produce a bulge as shown at 172 in FIG. 13.

The frictional engagement of surfaces 100 and 134 creates an effective waterseal between housings 30 and 32.

The outward expansion of surface 134 is accompanied by a radial outward expansion of frusto-conical surface 136, this latter expansion occurring in pivotal fashion about the circle of juncture between surfaces 136 and 138, until with surface 106 engaging surface 138 surface 136 forms substantially an unbroken cylindrical extension of surface 134. Were it not for frusto-conical surface 136, that is, if surface 134 normally were continuous from end 110 to surface 138, the outward expansion thereof would be accompanied by the production of a fillet of material between surfaces 134 and 138 and this fillet would tend undesirably to force surface 106 away from surface 138. Thus the relief defined by surfaces 136 and 138 serves the function of assuring that housing 30 is fully plugged into housing 32.

The action of mastic material 144 during the assembling of plug member 26 (and related parts) with housing 30 and during the assembling of socket member 28 (and related parts) with housing 32 will now be described, attention first being given to the mastic material 144 in housing 30.

Plug member 26 engages and essentially pierces material 144, making an axial hole therethrough. During this piercing, which is facilitated by the reduced diameter of part 41 with respect to part 43, there may be some axial displacement of material 144 toward end 76, but in any event, the piercing is completed by the time part 41 enters surface 84. Thus at this point practically all of mastic material 144 which was originally in housing 30 is for practical purposes trapped against further movement toward end 76 although it can move substantially freely toward end 74. To permit this free movement it is preferable that part 41 enter surface 84 prior to the time bevel 37 enters end 74 so that movement of material 144 is not impeded by trapped air. Then as part 43 enters material 144, material 144 is forced to move toward end 74. When bevel 37 does enter end 74, considerable hydraulic force is built up which drives all remaining air through the highly frictional keyway 98, followed by material 144, so that keyway 98 will eventually be completely filled with material 144. To assure that this will be so, it is desirable that housing 30 initially contain an excess of material 144. This excess will be forced completely through keyway 98 and can then be wiped off.

Pin 148 and, later, socket member 28 engage and essentially pierce material 144, making an axial hole therethrough. During this piercing, which is facilitated by the fact that pin portion 162 is relatively quite small, there may be some axial displacement of material 144 toward end 110, but in any event, the piercing is completed by the time pin portion 162 enters surface 118. Thus at this point practically all of mastic material 144 which was originally in housing 32 is for practical purposes trapped against further movement toward end 110, although desirably it can move substantially freely toward end 108. To permit this free movement it is preferable that portion 162 enter surface 118 prior to the time bevel 39 enters end 108, so that movement of material 144 toward end 108 is not impeded by trapped air. Then as pin portion 160 enters material 144, material 144 is forced to move toward end 108. So that pin portion 160 and the wall of portion 120 of opening 112 exert as little frictional force on material 144 as possible, the diameter of portion 160 is as small as possible consistent with providing shoulder 164. When bevel 39 does enter end 108, considerable hydraulic force is built up which drives all remaining air through the highly frictional keyway 140 followed by material 144, so that keyway 140 eventually will be completely fill with material 144. To assure that this will be so, it is desirable that housing 32 initially contain an excess of material 144. This excess will be forced completely through keyway into the annular space between pin 148 and sleeve 146 and will mostly be removed with sleeve 146. However, a residuum of material 144 desirably adheres to surface 138, and this residuum serves to fill or substantially fill the annular space between the open end of socket member 28 and surface 76 when housings 30 and 32 are plugged together. Pin 148 also serves to prevent material 144 from undesirably entering socket portion 44 as the latter proceeds through material 144.

In net result mastic material 144 completely fills all parts of portions 80, 86, 88, 114, 120 and 124 of openings 78 and 112 not otherwise occupied by members 26 and 28 and cables 16 and 22, as well as all parts of keyways 98 and 140.

To facilitate the aforesaid piercing of material 144 by member 26, pin 148 and member 28, it is desirable that the annular spaces between the wall of opening 78 and member 26, on the one hand, and between the wall of opening 112 and member 28, on the other hand, have relatively large dimensions in planes perpendicular to the axes of members 30 and 32. To that end it may be beneficial to enlarge portion 120 of opening 112 of housing 32 as shown at 174 from a location axially adjacent surface 128 to a location axially between surface 128 and end 108. Housing 30 is not shown as having an enlargement similar to enlargement 174 inasmuch as the diameter of part 43 of plug member 26 is smaller than the outside diameter of sleeve 48, although in some cases this may be desirable.

It is to be noted that, due to their resiliency, housings 30 and 32 may be used with cables of varying outside diameters.

Furthermore, an assembly comprising either housing 30 and related parts or housing 32 and related parts can be used to make an electrical connection with means different from the other illustrated housing and related parts.

Housings 30 and 32 can conveniently be molded of synthetic rubber, of which properly compounded "S.B.R." (Styrene Butadiene Rubber) is a highly satisfactory example.

Surfaces 82 and 116 are as nearly perpendicular to the axes of housings 30 and 32 as is possible consistent with sound molding methods.

As far as cables 16 and 22 are concerned, jackets 18 and 24, the primary purpose of which is to provide physical protection and not electrical insulation, may be, for example, of properly compounded neoprene, polystyrene, polyvinyl or even lead.

It is also to be noted that in the event moisture enters a hole through jacket 18 or 24, such moisture may proceed toward the electrical connection between covering 18 or 24 and the cable insulation in a sort of capillary action. Such moisture will be blocked from further progress toward the metallic parts of the connection by the mastic material 144 at bevel 37 or 39, and no damage will be done.

To revert to mastic material 144, this material can vary from a low viscosity material to a high viscosity material to a solidifying material. Low viscosity material may be used where capillary properties are desired, and with this sort of material, of which Silicone compound is an example, there is possible bleeding of the material, this bleeding consisting of a migration of the dielectric component of the material to reinforce the electrical properties of the surfaces which it engages. High viscosity material, of which a suitable example is a low petroleum end point compound, exhibits little migratory function and is sticky, having a true affinity for the materials which it engages, and functions primarily as a dielectric bulk filler. A solidifying material, of which suitable examples are two-part rubber compounds or epoxies which could be mixed in the field and inserted into housing 30 and/or housing 32, could be used to advantage where mechanical resistance to nonaxial loading is desired. Low and high viscosity materials have the desirable function of dressing and re-dressing the surfaces which they engage over indefinite periods of time, thus maintaining electrical properties in the face of natural movements and strains to which the connection may be subjected.

It has been found desirable, just prior to the insertion of members 26 and 28 into housings 30 and 32, respectively, to put light coatings of mastic material 144 on those parts of cable jackets 18 and 24 which are to be within housings 30 and 32. This eases the insertion of cables 16 and 22 into housings 30 and 32, respectively, and also assures that concavities on jackets 18 and 24 will be filled with mastic material 144. Material 144 for this purpose may be obtained by inserting member 26 a short way into material 144 in housing 30 and removing member 26 from housing 30 and by inserting pin 148 a short way into material 144 in housing 32 and removing pin 148 from housing 32.

Members 26 and 28 may be zone annealed at socket portions 34 and 38 to enhance crimpability without impairing strength at other locations.

The invention is well adapted to the attainment of the stated objects and advantages and others.

Since many changes which will occur to those skilled in the art can be made without departing from the invention the details of the illustrated example are not to be taken as limitations upon the invention except as those details may be included in the appended claims.

What is claimed is:

1. Electrical cable connector means comprising a housing of resilient insulating material having first and second ends and an opening in open communication with each said end, said opening including a constricted portion spaced from each said end, a first end portion having a resiliently expansible internal surface between said constricted portion and said first end for gripping the jacket of the cable and a second end portion between said constricted portion and said second end, said housing further having a resiliently expansible internal waterseal surface between said constricted portion and said second end and in open communication with said second end and an internal vent passage in the form of a keyway having a first end in open communication with said first end portion and a second end in open communication with said second end of said housing, said keyway extending through said constricted portion and along said second end portion of said opening, a predetermined amount of mastic material in said first end portion of said opening, an elongate metallic connector member having a connecting part in the form of a receptacle at the first end thereof, a socket at the second end thereof to receive for attachment thereto the conducting means of the cable and a shouldered portion between said receptacle and said socket, and a disposable rigid pin having a free end and an end in said receptacle, said opening adapted to receive the assembly of said pin, said connector member and said cable, with said free end of said pin entering said first end portion of said opening, until said shouldered portion of said connector member engages said constricted portion of said opening and the cable jacket enters said first end portion of said opening and engages said resiliently expansible internal surface of said first end portion, so that during the insertion of said assembly into said opening air and a part of said mastic material will be forced through said keyway.

2. Electrical cable connector means comprising a housing of resilient insulating material having first and second ends and an opening in open commuication with each said end, said opening including a constricted portion spaced from each said end, a first end portion having a resiliently expansible internal surface between said constricted portion and said first end for gripping the jacket of the cable and a second end portion between said constricted portion and said second end, said housing further having an external waterseal surface in open communication with said second end and a vent passage in the form of a keyway having a first end in open communication with said first end portion and a second end in open communication with and at said second end of said housing, said keyway extending through said constricted portion and along said second end portion of said opening, a predetermined amount of mastic material in said first end portion of said opening and an elongate metallic connector member having a connecting part in the form of a plug at the first end thereof, a socket at the second end thereof to receive for attachment thereto the conducting means of the cable and a shouldered portion between said plug and said socket, said opening adapted to receive the assembly of said connector member and said cable, with said plug entering said first end portion of said opening, until said shouldered portion of said connector member engages said constricted portion of said opening and the cable jacket enters said first end portion of said opening and engages said resiliently expansible internal surface of said first end portion, so that during the insertion of said assembly into said opening air and a part of said mastic material will be forced through said keyway.

3. Electrical cable connector means comprising a housing of resilient insulating material having first and second ends and an opening in open communication with each said end, said opening including a constricted portion spaced from each end, a first end portion having a resiliently expansible internal surface between said constricted portion and said first end for gripping the jacket of the cable and a second end portion between said constricted portion and said second end, said housing further having a waterseal surface in open communication with said second end and an internal vent passage having a first end in open communication with said first end portion and a second end in open communication with said second end portion of said opening, said vent passage extending through said constricted portion and along said second end portion of said opening, a predetermined amount of mastic material in said first end portion of said opening, and an elongate metallic connector member having a connecting part at the first end thereof, a socket at the second end thereof to receive for attachment thereto the conducting means of the cable and a shouldered portion between said connecting part and said socket, said opening adapted to receive the assembly of said connector member and said cable, with said connecting part entering said first end portion of said opening, until said shouldered portion of said connector member engages said constricted portion of said opening and the cable jacket enters said first end portion of said opening and engages said resiliently expansible internal surface of said first end portion, so that during the insertion of said assembly into said opening air and a part of said mastic material will be forced through said vent passage.

4. Electrical cable connector means comprising a housing of resilient insulating material having first and second ends and an opening in open communication with each said end, said opening including a constricted portion spaced from each said end, a first end portion having a resiliently expansible internal surface between said constricted portion and said first end for gripping the jacket of the cable and a second end portion between said constricted portion and said second end, said housing further having an internal vent passage having a first end in open communication with said first end portion and a second end effectively in open communication with said second end of said housing, said vent passage extending through said constricted portion and along said second end portion of said opening, a predetermined amount of mastic material in said first end portion of said opening, and an elongate metallic connector member having a connecting part at the first end thereof, a socket at the second end thereof to receive for attachment thereto the conducting means of the cable and a shouldered portion between said connecting part and said socket, said opening adapted to receive the assembly of said connector member and said cable, with said connector part entering said first end portion of said opening, until said shouldered portion of said connector member engages said constricted portion of said opening and the cable jacket enters said first end portion of said opening and engages said resiliently expansible internal surface of said first end portion, so that during the insertion of said assembly into said opening air and a part of said mastic material will be forced through said vent passage.

5. Electrical cable connector means for releasably joining a pair of cables, said means comprising a pair of housings of resilient insulating material, each said housing having a pair of ends and an opening in open communication with each said end of its housing, each said opening including a constricted portion spaced from each said end of its said housing, each said opening further including a first end portion between said constricted portion thereof and said first end of its said housing and having a resiliently expansible internal surface between said constricted portion thereof and said first end thereof for gripping the jacket of one of said cables, each said opening further having a second end portion between said constricted portion thereof and said second end of its said housing, each said housing further having an internal vent passage having a first end in open communication with said first end portion of its said housing and a second end effectively in open communication with said second end of its said housing, each said vent passage extending through said constricted portion of said opening of its said housing and along said second end portion of said opening of its said housing, a predetermined amount of mastic material in said first end portion of each said opening, each said housing further having a waterseal surface in open communication with said second end thereof, said waterseal surfaces adapted for releasable interfitting engagement with each other to form a waterproof joint therebetween, and a pair of elongate metallic connector members, each said connector member having a connecting part at the first end thereof, a socket at the second end thereof to receive for attachment thereto the connecting means of one of said cables to form an assembly therewith and a shouldered portion between said connecting part of its said connector member and said socket of its said connector member, said connecting parts adapted for releasable interfitting engagement with each other, said opening of one of said housings adapted to receive one of said assemblies, with said connecting part thereof entering said first end portion of said opening of said one housing, until said shouldered portion of said one assembly engages said constricted portion of said opening of said one housing and the cable jacket of said one assembly enters said first end portion of said opening of said one housing and engages said resiliently expansible internal surface thereof, said opening of the other of said housings adapted to receive the other of said assemblies, with said connecting part thereof entering said first end portion of said opening of said other housing, until said shouldered portion of said other assembly engages said constricted portion of said other housing and the cable jacket of asid other assembly enters said first end portion of said opening of said other housing and engages said resiliently expansible internal surface thereof, so that during the insertion of said assemblies into said openings as aforesaid, air and a part of said mastic material will be forced through said vent passages, and thereafter said connecting parts of said connector members can be interfitted as aforesaid simultaneously with the interfitting of said waterseal surfaces.

6. A method of terminating an electrical cable by means of a housing of resilient insulating material having an opening therethrough, said opening including a constricted portion and an end portion having a resiliently expansible internal surface between said constricted portion and one end of said opening and an elongate metallic connector member having a connecting part at one end thereof, a socket at the other end thereof and a shouldered portion therebetween, said method comprising the steps of placing a predetermined amount of mastic material in said end portion of said opening, attaching said socket to the conducting means of said cable and thereafter inserting said connector member, with said cable attached therto, into said one end of said opening until said shouldered portion engages said constricted portion and the cable jacket enters said end portion and engages said resiliently expansible internal surface, and during the inserting step venting air and a part of said mastic material from said end portion of said opening.

7. A method of terminating an electrical cable by means of a housing of resilient insulating material having an opening therethrough, said opening including a constricted portion and an end portion containing mastic material and having a resiliently expansible internal surface between said constricted portion and one end of said opening and an elongate metallic connector member having a connecting part at one end thereof, a socket at the other end thereof and a shoulder, said method comprising the steps of attaching said socket to the connecting means of said cable and thereafter inserting said connector member into said opening until said constricted portion overlaps said shoulder with the cable jacket engaging said resiliently expansible surface, and during the inserting step venting air and a part of said mastic material from said end portion of said opening.

References Cited in the file of this patent
UNITED STATES PATENTS

| | | |
|---|---|---|
| 2,223,991 | Horni | Dec. 3, 1940 |
| 2,700,140 | Phillips | Jan. 18, 1955 |
| 2,753,534 | Sprigg | July 3, 1956 |